US007030972B2

(12) United States Patent
Donahue et al.

(10) Patent No.: US 7,030,972 B2
(45) Date of Patent: Apr. 18, 2006

(54) SYSTEM AND METHOD FOR IDENTIFYING OBJECTS

(75) Inventors: Frederick A. Donahue, Walworth, NY (US); Eric A. Merz, Palmyra, NY (US)

(73) Assignee: Xerox Corporation, Stamford, CT (US)

( * ) Notice: Subject to any disclaimer, the term of this patent is extended or adjusted under 35 U.S.C. 154(b) by 307 days.

(21) Appl. No.: 10/073,091

(22) Filed: Feb. 12, 2002

(65) Prior Publication Data

US 2003/0151734 A1 Aug. 14, 2003

(51) Int. Cl.
*G06K 9/74* (2006.01)

(52) U.S. Cl. ......................... 356/71; 356/369; 235/454

(58) Field of Classification Search .................. 356/71, 356/364, 369, 614, 615, 620, 622; 235/454, 235/455, 462.35, 457
See application file for complete search history.

(56) References Cited

U.S. PATENT DOCUMENTS 3,631,254 A * 12/1971 Covault ...................... 250/342
3,748,484 A * 7/1973 Covault ...................... 250/225
5,616,929 A 4/1997 Hara et al. .................. 250/573
6,301,047 B1 * 10/2001 Hoshino et al. ............ 359/566
6,583,415 B1 * 6/2003 Stevens ...................... 250/330
6,740,431 B1 * 5/2004 Hoshino et al. .............. 283/83
2001/0035887 A1 11/2001 Altfather et al.

* cited by examiner

*Primary Examiner*—Gregory J. Toatley, Jr.
*Assistant Examiner*—Roy M. Punnoose
(74) *Attorney, Agent, or Firm*—Nixon Peabody LLP.

(57) ABSTRACT

Method and system for detecting the presence and determining characteristics of objects such as ink cartridges in printing systems. The system includes a signal transceiver capable of transmitting signals using a photo emitter and capable of receiving signals sent from the objects using a photo detector, and a monitoring system coupled to the signal transceiver for processing received signals to determine characteristics of the objects. Further, the photo emitter is at least partially covered by a first optical polarizer and the objects include a reflective surface that is at least partially covered by a second optical polarizer. When signals are transmitted from the signal transceiver to the objects, the second optical polarizer allows the signals to reach the reflective surface and reflect back towards the signal transceiver if the orientations of the first and second optical polarizers are substantially the same.

19 Claims, 9 Drawing Sheets

FIG. 6
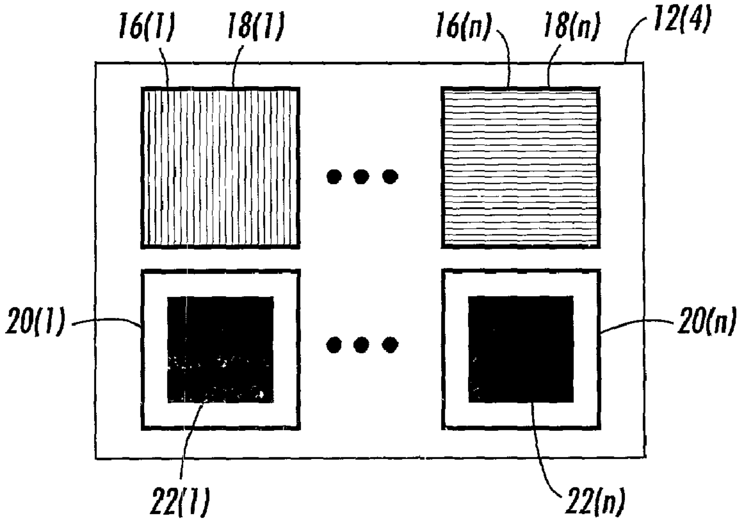
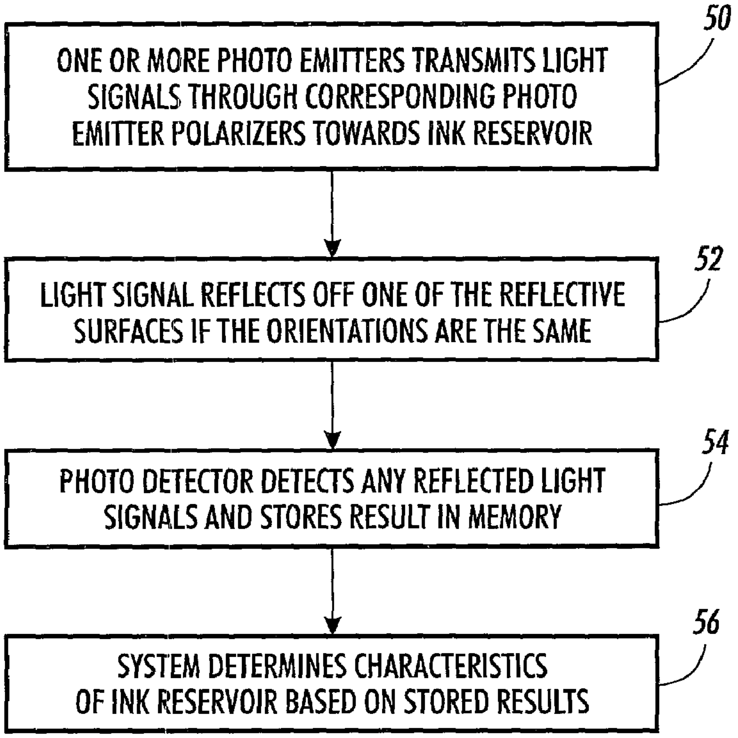
FIG. 7

SYSTEM AND METHOD FOR IDENTIFYING OBJECTS

FIELD OF THE INVENTION

This invention relates generally to printing systems and, more particularly, to a system and method for detecting the presence and determining characteristics of ink cartridges using optical polarizers.

BACKGROUND OF THE INVENTION

In printing systems or other environments, it may become necessary to detect the presence of objects such as the ink cartridges used for printing and, further, to identify one or more characteristics of the ink cartridges to maintain proper operation. Examples of such characteristics include a cartridge's fluid capacity (e.g., low or high), the type (i.e., brand) of cartridge, or the presence of the cartridge in the printing system.

Printing systems are susceptible to damage when operated without an ink supply, often referred to as "dry firing." Detecting the absence of an ink cartridge could prevent such damage from occurring. Furthermore, printing systems frequently utilize low or high capacity ink cartridges. To determine the amount of ink in the cartridges during printing, some printing systems use a pixel-counting scheme. Once determined, the amount of ink present in the cartridges may be expressed as a "gas gauge" displayed on a printing system user's computer screen. Ensuring the accuracy of such a gauge, however, requires detecting the presence of low or high capacity ink cartridges. Still further, identifying the particular brands of ink cartridges used in a printing system would be desirable for several reasons, such as to ensure proper operation and to prevent damage from using an ink cartridge that is not designed for a particular printing system.

Detecting the presence of ink cartridges and identifying one or more of their characteristics is difficult if an objective is to keep costs of the printing systems relatively low. But a cost-effective yet convenient solution for detecting the presence and characteristics of ink cartridges would greatly enhance the operation and maintenance of such printing systems.

SUMMARY OF THE INVENTION

A system for identifying at least one object in accordance with embodiments of the present invention includes a signal transceiver system that detects a polarized light signal from the object and a signal processing system that identifies at least one characteristic of the object in response to the detected polarized light signal.

A method and a program storage device readable by a machine and tangibly embodying a program of instructions executable by the machine for identifying at least one object in accordance with embodiments of the present invention includes detecting a polarized light signal from the object and identifying one or more characteristics of the object in response to the detected polarized light signal.

A system for communicating at least one characteristic of an object in accordance with embodiments of the present invention includes a polarizer system having an optical polarizer for processing a light signal and a signal system that sends the processed light signal.

A method for communicating at least one characteristic of an object in accordance with embodiments of the present invention includes processing a light signal using an optical polarizer and sending the processed light signal.

The present invention provides a cost effective, convenient and reliable method of detecting the presence of objects such as ink cartridges and identifying one or more of their characteristics. In addition, the present invention enhances the operation and maintenance of printing systems and prevents damage.

BRIEF DESCRIPTION OF THE DRAWINGS

FIGS. 5–6 are a perspective front view and a partial side view, respectively, of a system for identifying ink cartridges in accordance with embodiments of the present invention;

FIG. 7 is a flow chart of a process for identifying ink cartridges in accordance with embodiments of the present invention;

DETAILED DESCRIPTION OF THE INVENTION

Figure 1:
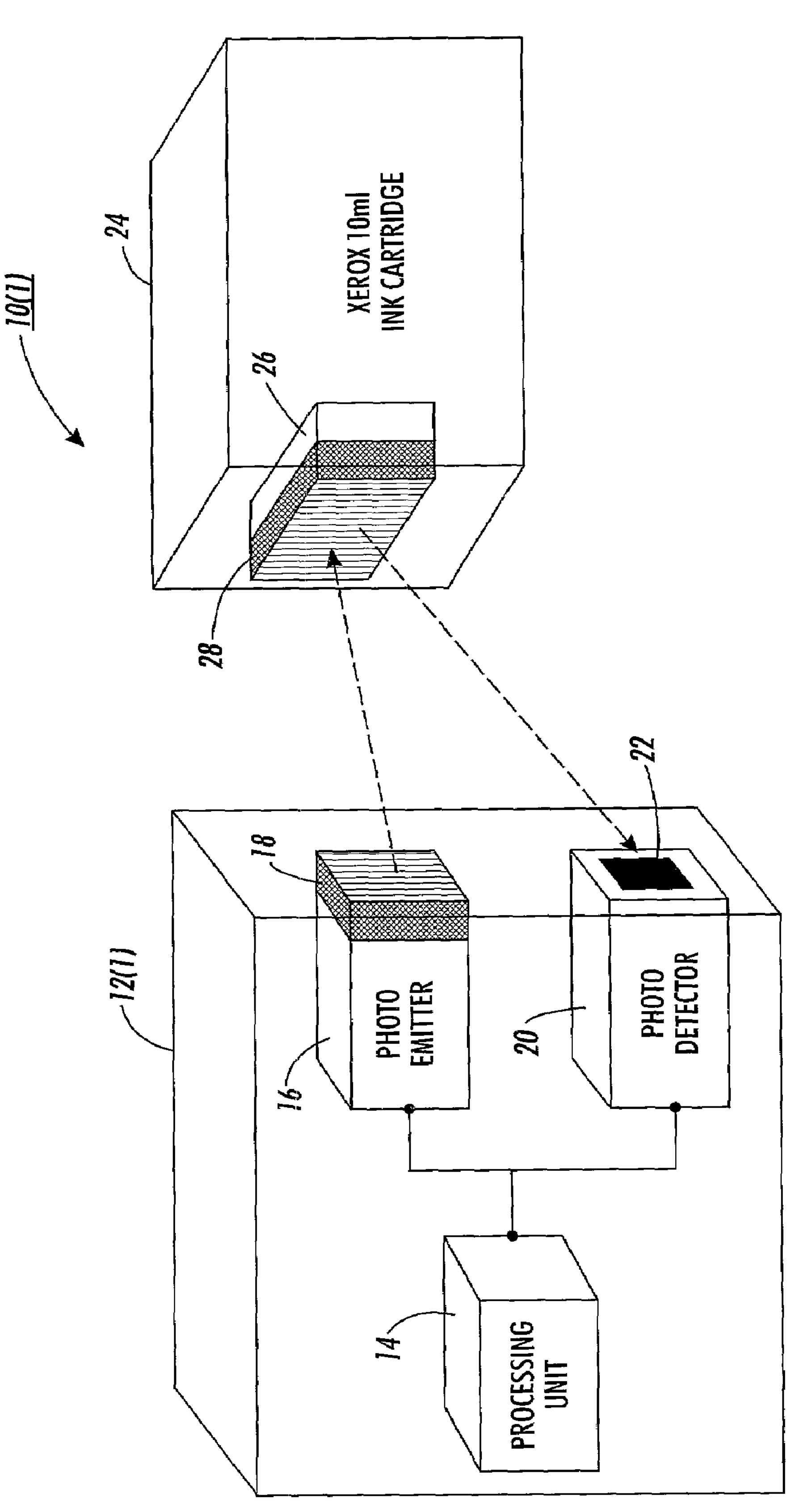
FIG. 1 is a perspective front view of a system for identifying ink cartridges in accordance with embodiments of the present invention.

A system 10(1) for identifying at least one object in accordance with embodiments of the present invention is shown in FIG. 1. System 10(1) includes monitoring system 12(1), which includes processing unit 14, photo emitter 16, photo emitter polarizer 18, photo detector 20, and ink cartridge 24, which includes reflective surface 26 and reflective surface polarizer 28. A method includes detecting a polarized light signal from the ink cartridge 24 and identifying one or more characteristics of the ink cartridge 24 in response to the detected polarized light signal. The present invention provides a cost effective, convenient and reliable method of detecting the presence of objects such as ink cartridges 24 and identifying one or more of their characteristics. The present invention also enhances the operation and maintenance of printing systems and prevents damage during printing operations.

In embodiments of the present invention, monitoring system 12(1) is connected to a printer system (not illustrated), although monitoring system 12(1) may be connected to other types of systems such as computer or key/lock systems. Monitoring system 12(1) may be arranged within the interior of the printer system in this example, although it may be arranged exterior to the printer system as well. Moreover, the monitoring system 12(1) may be connected to a processor of the printer system to communicate, for example, for outputting the information identified with respect to the ink cartridges 24 as described further herein below. Further, monitoring system 12(1) is oriented so that it has an unobstructed line of sight towards any ink cartridges 24 that may be present in the printer system to enable transmitting signals thereto or receiving signals therefrom.

Referring more specifically to FIG. 1, monitoring system 12(1) comprises processing unit 14, which is connected to photo emitter 16 and photo detector 20 by one or more buses. Monitoring system 12(1) may include a structure made of a of a number of materials such as plastics or metals that at least partially encloses processing unit 14, photo emitter 16 and photo detector 20. Moreover, one or more of processing unit 14, photo emitter 16 and photo detector 20 may be connected to the structure of monitoring system 12(1).

Processing unit 14 comprises a central processing unit and memory (not illustrated), which may also be connected together by one or more buses, although processing unit 14 may comprise any type of device or system hardwired to perform one or more methods of the present invention as described and illustrated herein. Moreover, the instructions for performing the present invention may be stored in the memory of processing unit 14 and further, may be expressed as executable programs written in a number of computer programming languages such as BASIC, Pascal, C++, C#, Java, Perl, COBOL, FORTRAN, assembly language, machine code language, or any computer code or language that can be understood and executed by the processing unit 14. The memory may comprise any type of fixed or portable memory device accessible by the processing unit 14, such as hard-disks, floppy-disks, compact-disks, digital video-disks, magnetic tape, optical-disks, ferroelectric memory, read only memory, random access memory, electrically erasable programmable read only memory, flash memory, erasable programmable read only memory, static random access memory, dynamic random access memory, ferromagnetic memory, charge couple devices, smart cards, or any other type of computer-readable media.

Photo emitter 16 comprises a Light Emitting Diode ("LED"), although it may comprise a LASER diode, an incandescent bulb or any device capable of transmitting various types of photons (i.e., light signals) towards an intended target (e.g., ink cartridge 24) including infrared or ultraviolet signals. Additionally, the photo emitter 16 is positioned within monitoring system 12(1) so that it is aimed towards where a reflective surface 26 and reflective surface polarizer 28 of an ink cartridge 24 would be positioned if present in a printing system. Although a photo emitter 16 is shown in embodiments of the present invention, other types of devices capable of transmitting other types of signals, such as microwave, ultra-sonic, or any other signal that is capable of being reflected off of a surface (e.g., reflective surface 26) can be used.

Photo emitter polarizer 18 is connected to photo emitter 16 by any means including adhesives, straps or screws, although it may be formed integrally with photo emitter 16 to form one integrated structure. Photo emitter polarizer 18 comprises a polarized plastic film or any type of polarizing material such as the plastic film used to polarize LCD wristwatch displays or eye glasses, for example. Photo emitter polarizer 18 completely covers the portion of the photo emitter 16 emitting light signals, although the photo emitter polarizer 18 may partially cover the light signal emitting portion of photo emitter 16.

Photo detector 20 comprises a photo diode, although it may comprise a photo transistor or a number of other light sensing devices capable of detecting various light signals including infrared or ultraviolet. Photo detector 20 further comprises an inlet 22 where it may capture incoming light signals. Additionally, the photo detector 20 is positioned within monitoring system 12(1) so that it may receive signals transmitted or reflected from where an ink cartridge 24 would be positioned if present in a printing system. Although a photo detector 20 is shown in embodiments of the present invention, other types of devices capable of detecting other types of signals, such as microwave, ultra-sonic, or any other type of signal that may be transmitted from a source (e.g., photo emitter 16) or reflected off of a surface, e.g., reflective surface 26) can be used.

Ink cartridge 24 is connected to a printer system. Ink cartridge 24 may comprise a number of cartridges 24 having one or more reservoirs capable of supplying printing systems with ink during printing operations, such as the cartridge 24 used in Xerox® (e.g., M750 or XJ4C models), Hewlett-Packard or Canon printers.

Reflective surface 26 is connected to the ink cartridge 24 by a number of means including adhesives, straps or screws, although it may be formed integrally with ink cartridge 24 to form one integrated structure. Reflective surface, 26 may comprise a number of reflective materials such as prisms, mirrors or reflective metals. Moreover, reflective surface 26 may be connected at any location of ink cartridge 24 so long as the operation of ink cartridge 24 in a printer system is not hindered and ink cartridge 24 maintains an unobstructed line of sight with respect to monitoring system 12(1). Although not illustrated in detail, the reflective surface 26 is connected to or formed integrally with the ink cartridge 24 in a configuration that will enable the surface 26 to reflect received light signals back towards their source (e.g., monitoring system 12(1)). One of a number of exemplary configurations that may be used for the reflective surface 26 with respect to the ink cartridge 24 is described at col. 5, lines 11–20 and illustrated in FIGS. 3A–3B in U.S. Pat. No. 5,616,929 issued to Hara, assigned to Fuji Xerox® Co., Ltd., Tokyo, Japan, which is hereby incorporated by reference in its entirety.

Reflective surface polarizer 28 is connected to reflective surface 26 in the same manner described above with respect to photo emitter 16 and photo emitter polarizer 18. Further, reflective surface polarizer 28 is the same as photo emitter polarizer 18, although it may be oriented differently as will be explained further herein below. Reflective polarizer 28 completely covers reflective surface 26, although it may instead partially cover the reflective surface 26.

Figure 2:
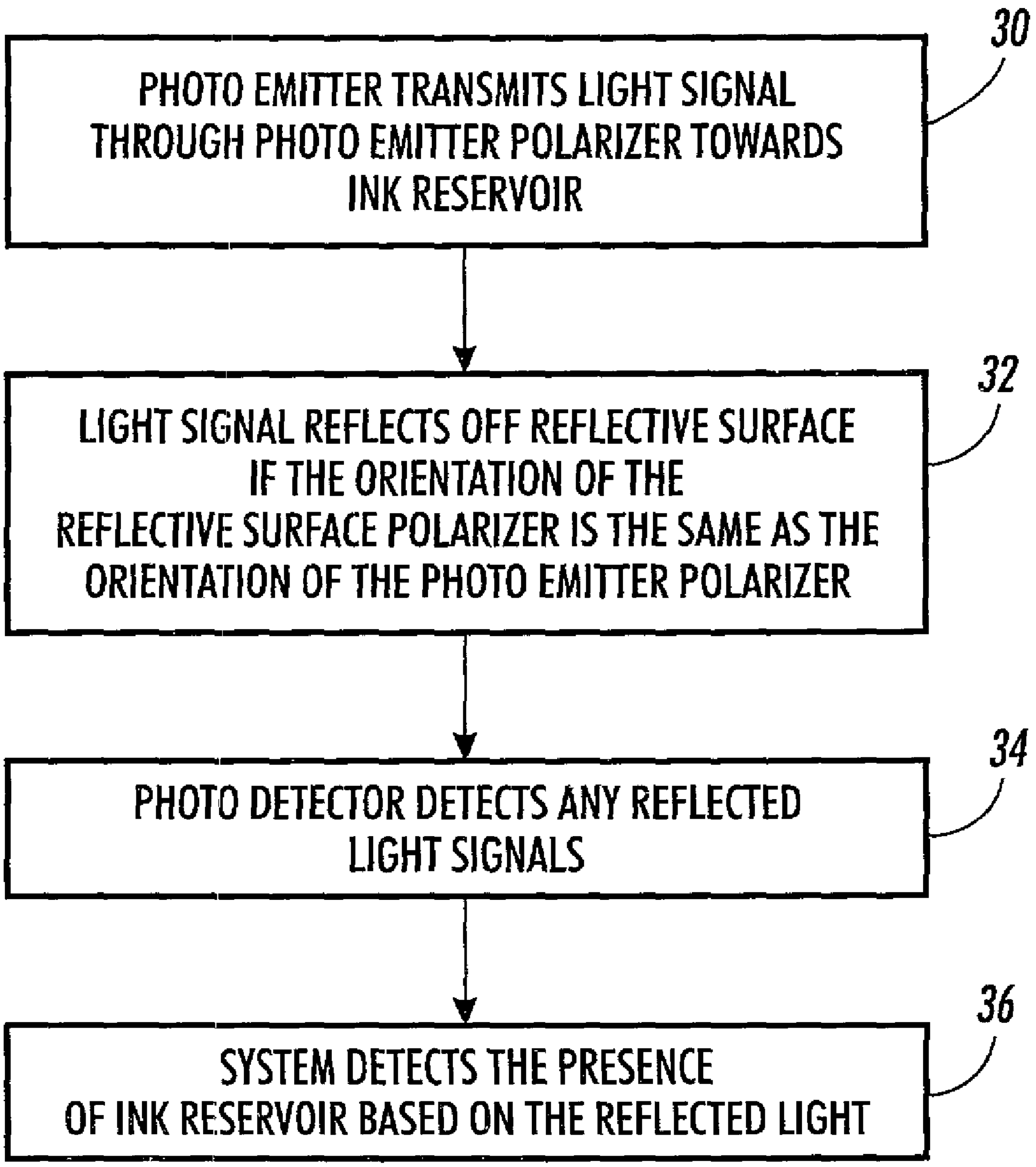
FIG. 2 is a flow chart of a process for identifying ink cartridges.

Referring to FIGS. 1–2, the operation of system 10(1) for identifying characteristics of ink cartridge 24 will now be described. At step 30, processing unit 14 signals the photo emitter 16 to transmit a light signal through the photo emitter polarizer 18 towards the ink cartridge 24, indicated as the dashed line terminating with a right-handed arrow. The light signal is polarized as it penetrates the photo emitter polarizer 18. The processing unit 14 may cause the photo emitter unit 16 to emit light signals upon several instances depending upon the type of information sought with respect to the ink cartridge 24 as will be described in further detail herein below. For instance, processing unit 14 may execute a polling routine to monitor for the presence ink cartridges 24 in the printing system.

Next at step 32, the light signal penetrates the reflective surface polarizer 28 and reflects off of reflective surface 26 if the orientations of the reflective surface polarizer 28 and the photo emitter polarizer 18 are substantially the same with respect to each other. In this example, the vertical lines shown on the surface of photo emitter polarizer 18 and reflective surface polarizer 28 are intended to depict the two polarizers having substantially the same orientation. Thus, the light signal is able to reach the reflective surface 26 and reflect back towards the monitoring system 12(1), indicated by the dashed line terminating with a left-handed arrow. However if photo emitter polarizer 18 and reflective surface polarizer 28 do not have substantially the same orientation, the light signal transmitted from photo emitter 16 through photo emitter polarizer 18 will not be able to penetrate the reflective surface polarizer 28 to reach the reflective surface 26, and hence will not reflect back towards monitoring system 12(1).

Next at step 34, photo detector 20 detects the light signal reflected back from ink cartridge 24. In particular, the photo detector 20 captures the light signal as it enters the inlet 22. Once the photo detector 20 detects the light signal, it transmits an interrupt signal to processing unit 14.

Next at step 36, processing unit 14 receives the interrupt signal and processes it according to the programming stored in its memory. As mentioned above, the processing unit 14 may be programmed to detect the presence of ink cartridges 24 in printing systems. In particular, the programming executed by processing unit 14 may instruct it to respond to the interrupt signal by communicating to the printer system that it detects the presence of an ink cartridge 24. Thus, processing unit 14 determines that an ink cartridge 24 is present by causing photo emitter 16 to transmit polarized light signals towards the ink cartridge 24, and if the polarized light signal is reflected back towards the monitoring system 12(1) as detected by the photo detector 20, then ink cartridge 24 is determined to be present. If at step 32 the photo emitter polarizer 18 and the reflective surface polarizer 28 do not have substantially the same orientation, then processing unit 14 may be programmed to conclude after a predetermined amount of time from when the signal is transmitted, such as half a second or any amount of time sufficient to allow a light signal to be reflected back, that ink cartridge 24 is not present. Alternatively, processing unit 14 may be programmed to conclude that an incompatible ink cartridge 24 is present.

Figure 3:
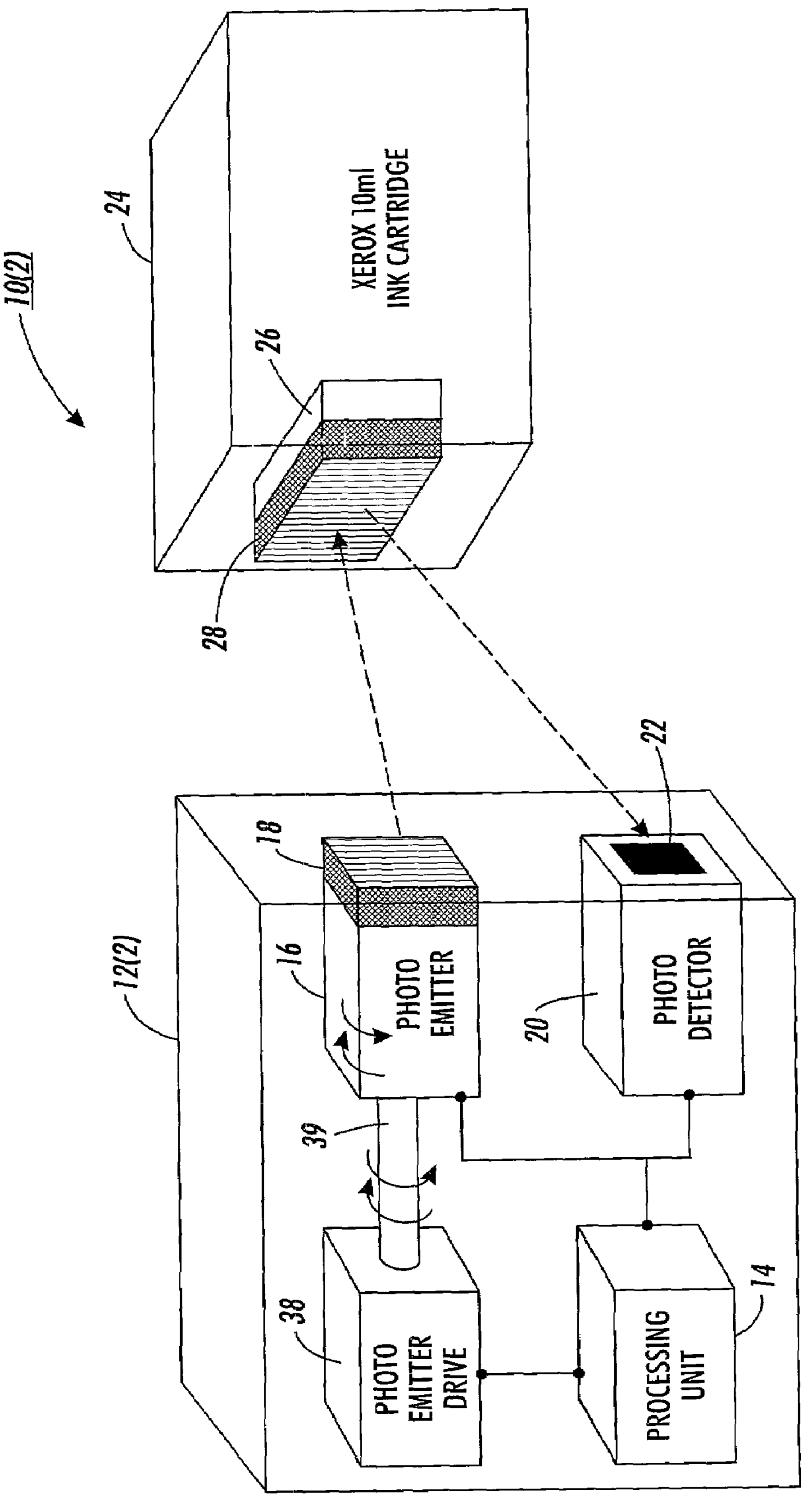
FIG. 3 is a partial perspective front view of a system for identifying ink cartridges in accordance with embodiments of the present invention.

Referring to FIG. 3, an alternative embodiment of system 10(1) will now be described. Like reference numbers in FIG. 3 are identical to those in and described with reference to FIG. 1, except in this embodiment, system 10(2) includes monitoring system 12(2) substituted for monitoring system 12(1). Monitoring system 12(2) is the same as monitoring system 12(1), but includes a photo emitter drive 38 as described further herein below.

Photo emitter drive 38 is connected to the processing unit 14 by one or more buses and to the photo emitter 16 by drive shaft 39. Photo emitter drive 38 comprises an electrical motor, although it may comprise any type of motorized device capable of applying sufficient torque to shaft 39 for rotating photo emitter 16. In embodiments of the present invention, photo emitter 16 is connected to one or more mechanisms that enable it to rotate within monitoring system 12(2) as described herein. Photo emitter 16 may rotate in a clockwise fashion, although it may rotate in a counterclokwise fashion. The operation of photo emitter drive 38 is controlled by the processing unit which directs it when to start and stop rotation of drive shaft 39 and in which direction (i.e., clockwise or counterclockwise) as described further herein.

Further, processing unit 14 includes programming for operating the photo emitter drive 38 to rotate the photo emitter 16 while causing the photo emitter 16 to emit light signals. Photo emitter drive 38 rotates the photo emitter 16 in a clockwise fashion to change the orientation of photo emitter polarizer 18. Moreover, processing unit 14 is programmed to associate predetermined positions along the rotation of the photo emitter 16 with a particular type of ink cartridge 24, the associations being stored in the memory of processing unit 14 in the form of a database or lookup table.

The reflective surface polarizer 28 may be oriented on the reflective surface 26 of ink cartridge 24 in a specific position unique to the particular type of ink cartridge 24. Moreover, the orientation of the reflective surface polarizer 28 is associated with one of the predetermined positions stored in the memory of processing unit 14 described above.

The same steps are performed for identifying characteristics of ink cartridge 24 as described above in connection with steps 30-36, but instead of detecting its presence, monitoring system 12(2) determines the particular type of ink cartridge 24 used in a printer system as explained further herein. In particular, at step 32, the processing unit 14 using the photo emitter drive 38 rotates the photo emitter 16. As photo emitter 16 is rotated to each predetermined position, processing unit 14 performs step 30, and if the light signal is reflected back and detected as described in steps 32–34, then processing unit 14 accesses its memory to determine the type of ink cartridge 24 present according to the stored association with respect to the predetermined position. Alternatively, processing unit 14 may operate the photo emitter 16 to continuously rotate while emitting light signals until the photo detector 20 detects a reflected light signal. In this example, the processing unit 14 would still access its memory to determine the ink cartridge 24 as explained above. In either case, processing unit 14 communicates its determination to the printer system as described above in step 36.

Figure 4:
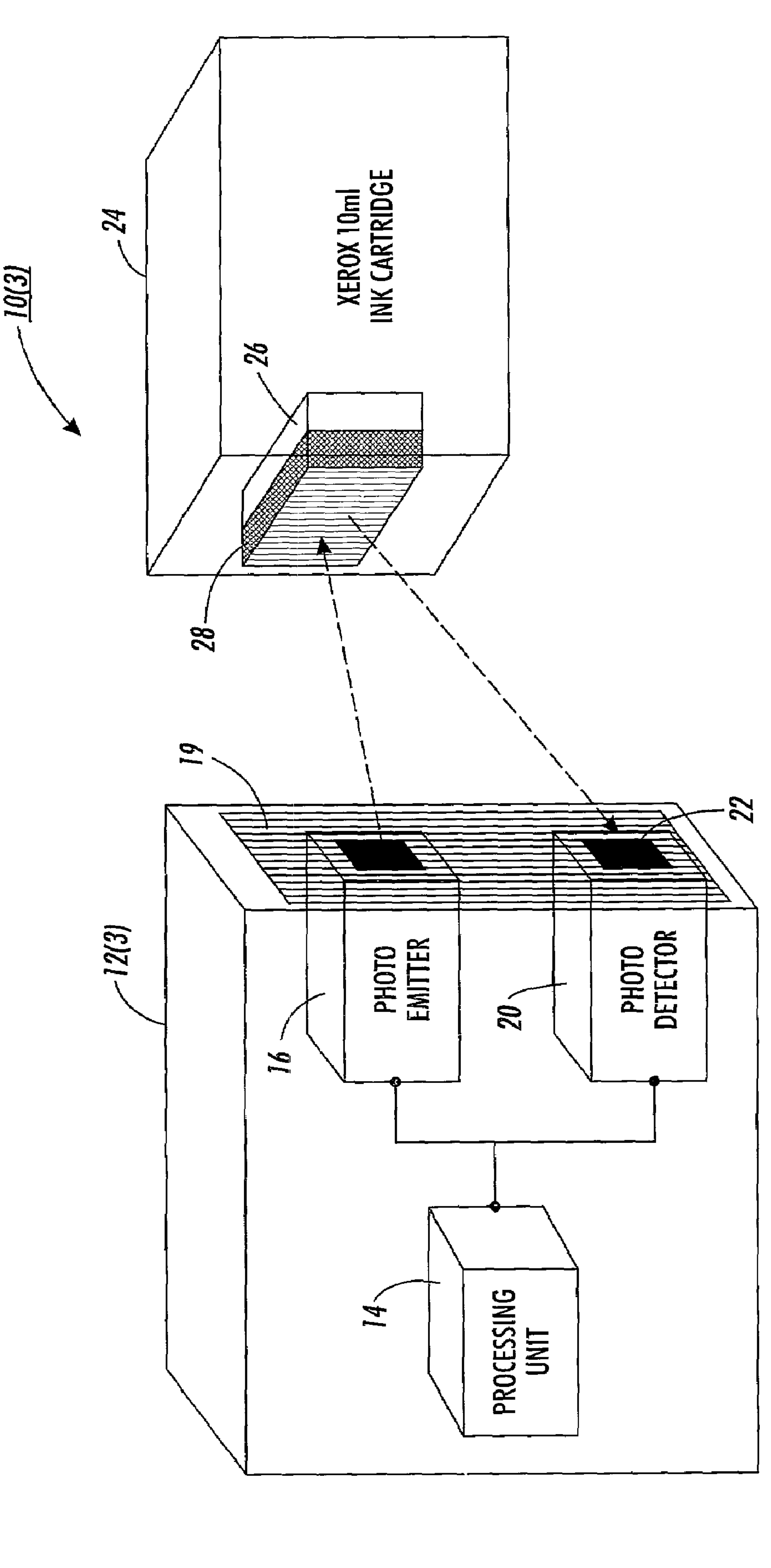
FIG. 4 is a partial perspective front view of a system for identifying ink cartridges in accordance with embodiments of the present invention.
Figure 5:
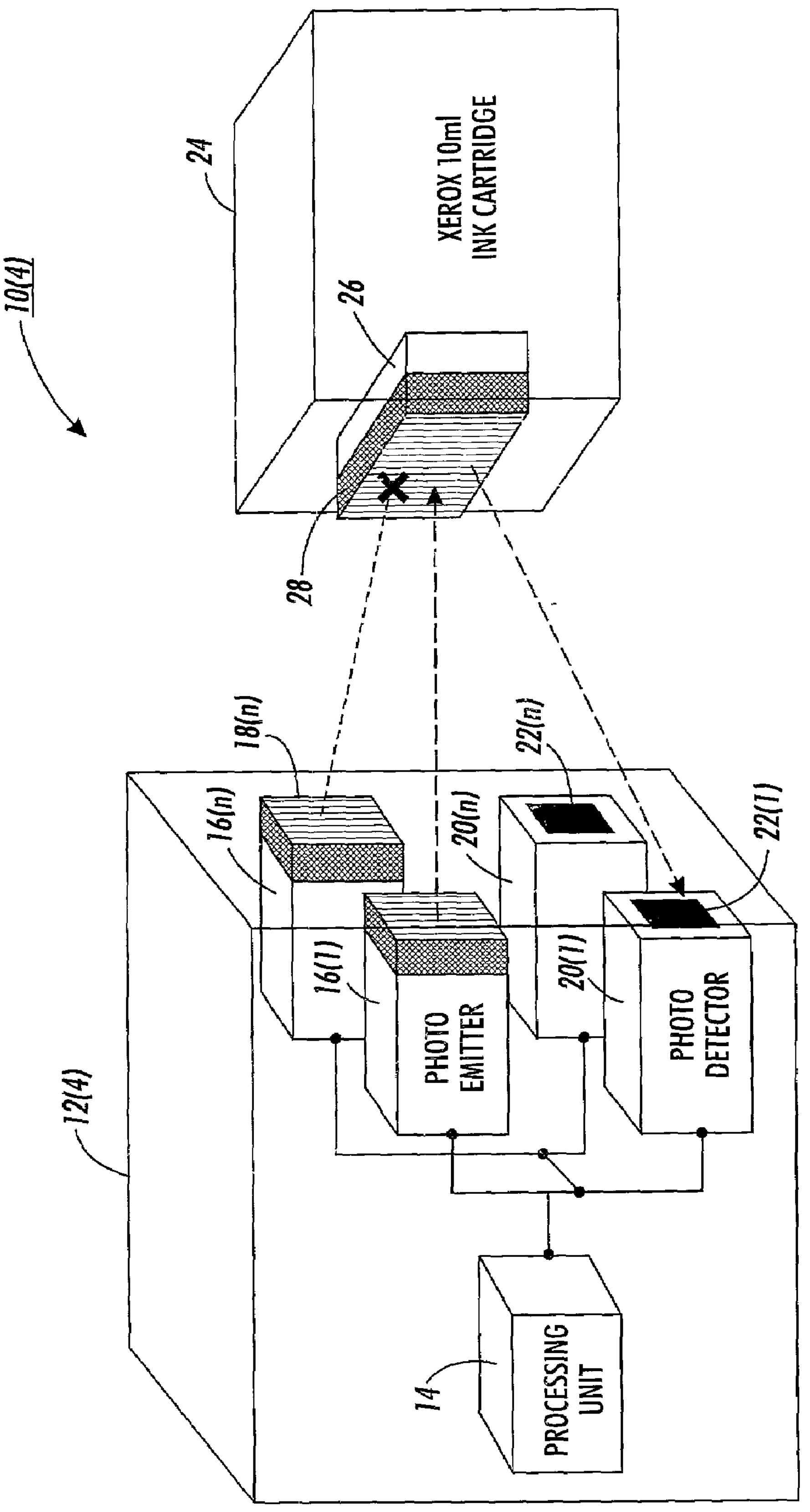

Referring to FIG. 4, an alternative embodiment of system 10(1) will now be described. Like reference numbers in FIG. 4 are identical to those in and described with reference to FIG. 1, except in this embodiment, system 10(3) includes monitoring system 12(3) substituted for monitoring system 12(1). Monitoring system 12(3) is the same as monitoring system 12(1) but includes a modified photo emitter polarizer 19 substituted for photo emitter polarizer 18 as described herein below.

Modified photo emitter polarizer 19 is the same as photo emitter polarizer 18 except as described herein. Modified photo emitter polarizer 19 in this embodiment is connected to the monitoring system 12(3) by any means including adhesives, straps or screws, although it may be formed integrally with the monitoring system 12(3) to form one integrated structure. Moreover, modified photo emitter polarizer 19 completely covers the portion of the photo emitter 16 emitting light signals and the inlet 22 of the photo detector 20, although it may instead partially cover the photo emitter 16 and inlet 22.

The same steps are performed for identifying characteristics of ink cartridge 24 as described above in connection with steps 3–6 in FIG. 2, except at step 34 photo detector 20 detects only light signals that have the same orientation as the modified photo emitter polarizer 19. Thus, an ink cartridge 24 having a photo emitter 16 that transmits a light signal instead of reflecting a signal would need to transmit a light signal having substantially the same polarization to be able to communicate with the monitoring system 12(3).

Referring to FIGS. 5–9, an alternative embodiment of system 10(1) will now be described. Like reference numbers in FIGS. 5–6 and 8–9 are identical to those in and described with reference to FIG. 1, except in this embodiment, system 10(4) includes monitoring system 12(4) substituted for monitoring system 12(1). Monitoring system 12(4) identifies characteristics of ink cartridges 22(1)–22(n), such as whether each has a low or a high capacity, a particular brand, whether any are present or whether an incompatible ink cartridge 22(1)–22(n) is present in the printer system. Monitoring system 12(4) is the same as monitoring system 12(11 except as described herein.

Monitoring system 12(4) includes one or more photo emitters 16(1)–16(n), photo emitter polarizers 18(1)–18(n) and photo detectors 20(1)–20(n). Each photo emitter polarizer 18(1)–18(n) is oriented in a unique position with respect to each other, although one or more may have substantially the same orientation. For instance, photo emitter polarizer 18(1) is shown as being oriented in a first position by the vertical lines. In contrast, photo emitter polarizer 18(n) is shown as being oriented in a second position by the horizontal lines. Photo detectors 20(1)–20(n) are associated with photo emitters 16(1)–16(n), respectively, each having a one-to-one relationship, although other relationships may exist. Monitoring system 12(4) is positioned within a printing system such that the photo emitters 16(1)–16(n) are aimed towards where the reflective surface polarizers 28(1) –28(n) would be positioned if any one of the ink cartridges 24(1)–24(n) was present in the printing system. Further, any number of photo emitters 16(1)–16(n), photo emitters 18(1) –18(n) and photo detectors 20(1)–20(n) may be used so long as there is enough physical space available with respect to the printer system to accommodate the monitoring system 12(4).

Processing unit 14 may have stored in its memory in the form of a database or lookup table an association between a reading of a photo detector 20(1)–20(n) and a particular characteristic of an ink cartridge 24(1)–24(n). Such a database or lookup table may be organized as shown in Table 1 below:

TABLE 1

| Tank Characteristic | Photo Detector 20(1) Reading | Photo Detector 20(n) Reading |
|---|---|---|
| High Capacity | High | Low |
| Low Capacity | Low | High |
| No Ink Tank Present -or- Incompatible Ink Tank Type | Low | Low |

Figure 8:
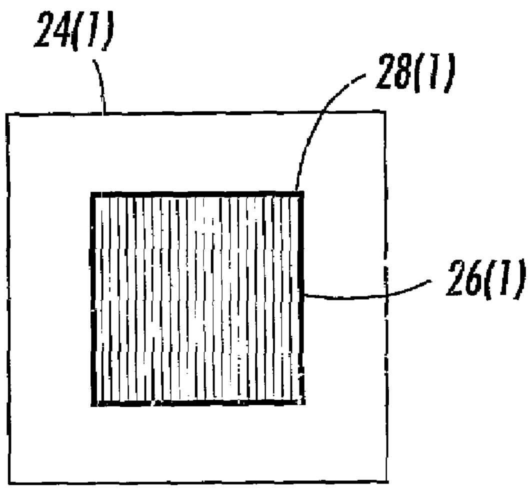
FIGS. 8–9 are side views of a first and second exemplary ink cartridge.
Figure 9:
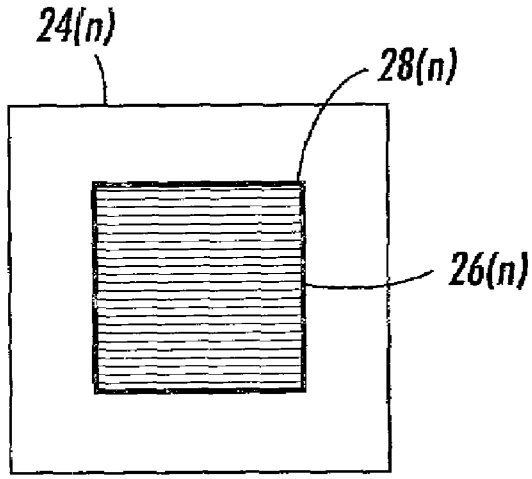

Referring to FIG. 7, beginning at step 50, processing unit 14 of monitoring system 12(4) causes light signals to be transmitted through photo emitter polarizers 18(1)–18(n) towards the direction of any one of the ink cartridges 24(1)–24(n) shown in FIGS. 7–8 that may be present in a printer system. As explained above, the light signals are polarized as they penetrate and pass through the photo emitter polarizers 18(1)–18(n). Monitoring system 12(4) transmits light signals upon several instances depending upon the type of information sought with respect to toe ink cartridges 24(1)–24(n), including any of the types of information described above in the embodiments of the present invention.

Next at step 52, one of the light signals transmitted through one of the photo emitter polarizers 18(1)–18(n) penetrates one of the reflective surface polarizers 28(1)–28 (n) of ink cartridges 24(1)–24(n) shown in FIGS. 7–8. For instance, the light signal transmitted through photo emitter polarizer 18(1) may penetrate the reflective surface polarizer 28(1) and thus be reflected back towards the monitoring system 12(4) since the vertical lines are in substantially the same configuration.

Next at step 54, photo detector 20(1) detects the light signal reflected back from ink cartridge 24(1). In particular, the photo detector 20(1) captures the light signal as it enters the photo detector inlet 22(1) and transmits an interrupt signal to processing unit 14 as described above in the embodiments of the present invention. In this example, each one of the photo emitters 16(1)–16(n) may sequentially transmit light signals through each of the photo emitter polarizers 18(1)–18(n), allowing enough time between light signal transmissions to detect whether the light signals were reflected back from one of the ink cartridges 24(1)–24(n) and captured by photo detectors 20(1)–20(n).

Next at step 56, processing unit 14 receives the interrupt signal and processes it according to the program stored in its memory. The processing unit 14 is able to determine whether ink cartridges 24(1)–24(n) have a low or high capacity and to detect their presence in the printing system. Processing unit 14 responds to the interrupt signal by communicating to the printer system its determination. As shown in Table 1 above, if photo detector 20(1), associated with photo emitter polarizer 18(1), indicates a high signal reading (i.e., it detects a reflected signal), then processing unit 14 is able to determine by accessing Table 1 that ink cartridge 24(1) is present and has a high capacity. If photo detector 20(n), associated with photo emitter polarizer 18(n), indicates a high signal reading, then processing unit 14 determines that ink cartridge 24(n) is present and has a low capacity. Alternatively, if the photo detectors 20(1)–20(n) both indicate a low signal reading (i.e., neither detect a reflected signal), then processing unit 14 determines that none of the ink cartridges 24(1)–24(n) are present or that the ink cartridges 24(1)–24(n) are unknown to processing unit 14 and are therefore incompatible to the printing system.

Figure 10:
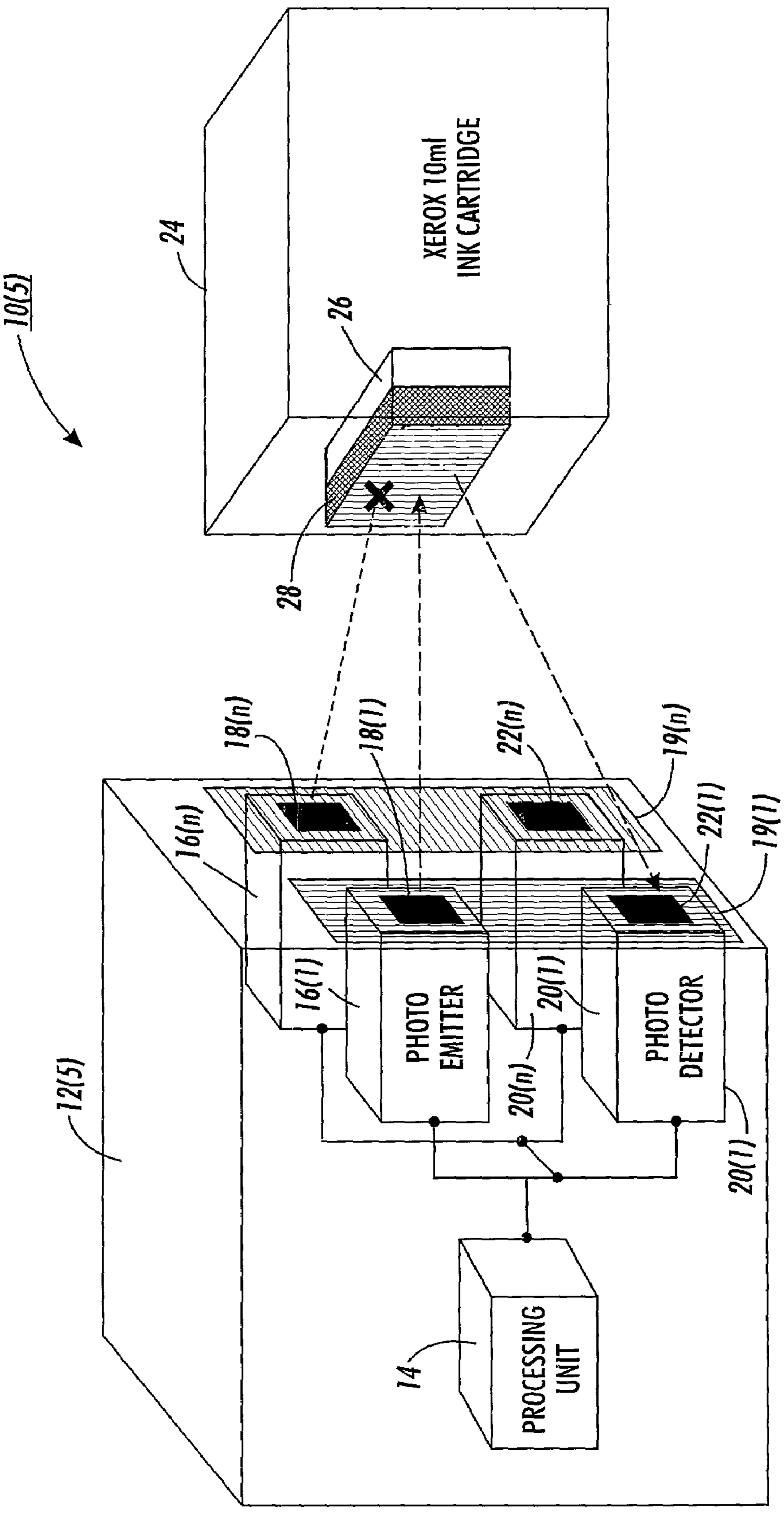
FIGS. 10–11 are a perspective front view and a partial side view, respectively, of a system for identifying ink cartridges in accordance with embodiments of the present invention.
Figure 11:
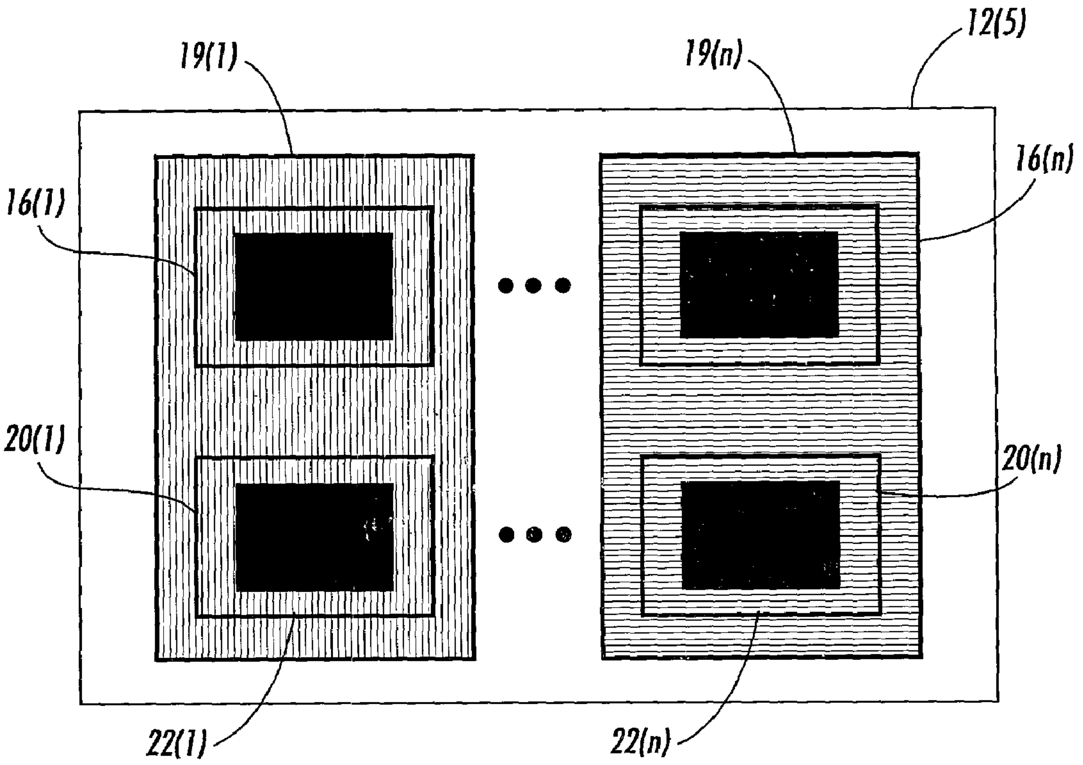

An alternative embodiment of system 10(1) will now be described. Like reference numbers in FIGS. 10–11 are identical to those in and described with reference to FIGS. 5–6, except in this embodiment, system 10(5) includes monitoring system 12(5) substituted for monitoring system 12(1). Monitoring system 12(5) is the same as monitoring system 12(1) but includes modified photo emitter polarizers 19(1)–19(n) substituted for photo emitter polarizers 18(1) –18(n) as described herein below.

Modified photo emitter polarizers 19(1)–19(n) are the same as photo emitter polarizers 18(1)–18(n) described above with respect to FIG. 4, but each modified polarizer 19(1)–19(n) substantially covers photo emitter 16(1)–16(n) and photo detector 20(1)–20(n), respectively.

In another embodiment of the present invention, the same steps are performed for identifying characteristics of ink cartridges 24(1)–24(n) as described above in connection with steps 50–56 in FIG. 7, except in this embodiment, at step 54 photo detectors 20(1)–20(n) detect only light signals that have the same orientation as the modified photo emitter polarizers 19(1)–19(n). Thus, an ink cartridge 24(1)–24(n) having a photo emitter 16(1)–16(n) that transmits a light signal instead of reflecting a signal would need to transmit a light signal having substantially the same polarization to be able to communicate with the monitoring system 12(5).

In another embodiment, the monitoring system 10(5) shown in FIGS. 10–11 may be used to identify characteristics of other objects (e.g., keys) besides ink cartridges 24(1)–24(n). Such a system may be utilized to detect reflected or transmitted signals when each of the modified photo emitter polarizers 19(1)–19(n) are oriented substantially the same with respect to corresponding reflective surface polarizers 28(1)–28(n) covering the reflective surfaces 26(1)–26(n) arranged on keys or reflective surface polarizers 28(1)–28(n) covering photo emitters 16(1)–16(n) where the keys have emitters 16(1)–16(n) to transmit signals.

Processing unit 14 in this example may be programmed to execute instructions for detecting reflected signals using photo detectors 20(1)–20(n) to operate in the same manner as the tumblers of a lock. In particular, there could be five photo emitters 16(1)–16(5) and photo detectors 20(1)–20(5), each covered by a modified photo emitter polarizer 19(1)–19(5), respectively, and arranged in a lock system, which simultaneously or within predetermined time increments transmit a light signal whereby photo detectors 20(1)–20(5) would detect any signals reflected off of reflective surfaces 26(1)–26(5) arranged on the key. The processing unit 14 could determine chat a correct key is being used when photo detectors 20(1)–20(5) detect a reflected signal having substantially the same polarization as modified photo emitter polarizers 19(1)–19(5), respectively.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A system for identifying at least one object, the system comprising:

a signal transceiver system that detects a polarized light signal from the at least one object;

a signal processing system that identifies at least one characteristic of the at least one object in response to the detected polarized light signal; and a first optical polarizer arranged in a first orientation on at least a portion of the signal transceiver system with respect to a second optical polarizer arranged in a second orientation on at least a portion of a reflective surface on the object, wherein the at least one object reflects the polarized light signal without diffracting the polarized light signal.

2. The system according to claim 1 further comprising a reflective surface on at least a portion of the object.

3. The system according to claim 1 wherein the signal transceiver system further comprises a photo emitter unit that transmits the polarized light signal towards the object.

4. The system according to claim 3 wherein the signal transceiver further comprises a drive unit that rotates the photo emitter unit, the signal processing system controlling the drive unit and causing the photo emitter unit to transmit the polarized light signal towards the object.

5. The system according to claim 1 wherein the first optical polarizer covers at least a portion of the photo emitter unit.

6. The system according to claim 1 wherein the first optical polarizer covers at least a portion of a photo detector unit of the signal transceiver system.

7. The system according to claim 1 wherein the signal transceiver system further comprises a photo detector unit that detects the polarized light signal from the object.

8. The system according to claim 1 wherein the object comprises an ink cartridge.

9. The system according to claim 1 wherein the at least one characteristic comprises a low or high capacity, a particular brand, or a presence of an ink cartridge in a printing system.

10. A method for identifying at least one object, the method comprising:

reflecting a transmitted polarized light signal off of a reflective surface on the object when the transmitted polarized light signal has a polarization that is substantially the same as the polarization of an optical polarizer covering at least a portion of the reflective surface;

detecting a polarized light signal from the object; and identifying at least one characteristic of the at least one object in response to the detected signal, wherein the at least one object reflects the polarized light signal without diffracting the polarized light signal.

11. The method according to claim 10 further comprising transmitting the polarized light signal towards the object.

12. The method according to claim 11 wherein the transmitting further comprises rotating a photo emitter unit, the transmitting being carried out by the photo emitter unit.

13. The method according to claim 10 wherein the detecting further comprises receiving the polarized light signal at a photo detector unit when the polarized light signal has a polarization that is substantially the same as the polarization of an optical polarizer covering at least a portion of the photo detector unit.

14. The method according to claim 10 wherein the identifying further comprises determining whether an ink cartridge has a low or high capacity, is a particular brand or is present in a printing system.

15. A computer readable medium having stored thereon instructions for identifying at least one object, which when executed by at least one processor, causes the processor to perform:

reflecting a transmitted polarized light signal off of a reflective surface on the object when the transmitted polarized light signal has a polarization that is substantially the same as the polarization of an optical polarizer covering at least a portion of the reflective surface;

detecting a polarized light signal from the at least one object; and identifying at least one characteristic of the at least one object in response to the detected polarized light signal, wherein the at least one object reflects the polarized light signal without diffracting the polarized light signal.

16. The medium according to claim 15 further comprising transmitting the polarized light signal towards the object.

17. The medium according to claim 16 wherein the transmitting further comprises rotating a photo emitter unit, the transmitting being carried out by the photo emitter unit.

18. The system according to claim 15 wherein the detecting further comprises receiving the polarized light signal at a photo detector unit when the polarized light signal has a polarization that is substantially the same as the polarization of an optical polarizer covering at least a portion of the photo detector unit.

19. The medium according to claim 15 wherein the identifying further comprises determining whether an ink cartridge has a low or high capacity, is a particular brand or is present in a printing system.

* * * * *